United States Patent [19]

Irabu

[11] Patent Number: 4,513,286
[45] Date of Patent: Apr. 23, 1985

[54] ADAPTIVE CONSTANT FALSE ALARM RATE (CFAR) PROCESSOR

[75] Inventor: Takeru Irabu, Tokyo, Japan

[73] Assignee: Nippon Electric Co., Ltd., Tokyo, Japan

[21] Appl. No.: 364,334

[22] Filed: Apr. 1, 1982

[30] Foreign Application Priority Data

Apr. 3, 1981 [JP] Japan .................................. 56-50082

[51] Int. Cl.³ .............................................. G01S 7/34
[52] U.S. Cl. .................................. 343/5 CF; 343/7 A
[58] Field of Search ................... 343/5 CE, 5 CF, 7 A

[56] References Cited

U.S. PATENT DOCUMENTS

| 4,031,364 | 6/1977 | Wilmot | 343/7 A X |
| 4,242,682 | 12/1982 | Musha et al. | 343/5 CF X |
| 4,318,101 | 3/1982 | Musha et al. | 343/5 CF |

OTHER PUBLICATIONS

G. B. Goldstein, *False-Alarm Regulation in Log-Normal and Weibull Clutter*, IEEE Trans. Aerospace and Elec. Systems, vol. AES-9, No. 1, Jan. 1973.

V. G. Hansen, *CFAR Processing in Search Radars*, International Conf. on Radars-Past and Present, Oct., 23-25, 1973, FIGS. 10 and 12.

M. Sekine et al., *Suppression of Weibull-Distributed Clutter Using a Cell Avg. Log/CFAR Receiver*, IEEE Proc. AES-14, No. 5, Sep. 1978.

Primary Examiner—T. H. Tubbesing
Assistant Examiner—Gilberto Barrón, Jr.
Attorney, Agent, or Firm—Sughrue, Mion, Zinn, Macpeak & Seas

[57] ABSTRACT

The incoming radar signals to a constant false alarm rate (CFAR) processor, having some known cumulative distribution function F(X) or probability density function f(X), are transformed into new signals Y according to the equation $$Y = \sigma[-\ln\{1 - F_x(X)\}]^{1/K}$$

where $\sigma$ and K are a scale parameter and shape parameter, respectively, and can be arbitrarily set. The threshold to which the processed signal is compared in the CFAR processing is variable in accordance with the selected value of K.

9 Claims, 6 Drawing Figures

ADAPTIVE CONSTANT FALSE ALARM RATE (CFAR) PROCESSOR

BACKGROUND OF THE INVENTION

The present invention relates to a constant false alarm rate (CFAR) processor for use in a radar receiver and, more particularly, to an adaptive CFAR processor which can maintain a constant false alarm rate against any probability density distribution function of clutter signal and offers a remarkable increase in target detectability.

Among known techniques for removing undesirable signals other than target signals in a radar system, a moving target indicator (MTI) has found extensive use which is designed to cancel returns from hills, buildings and like objects fixed in location. The MTI canceller, however, fails to effectively operate against those types of clutter having velocity components, e.g. sea clutter, weather clutter and angel echoes.

Various propositions have heretofore been made for suppressing clutters other than the returns from fixed objects. Typical of such propositions is the LOG/CFAR system (see J. Croney, "Clutter on Radar Display", Wireless Engineering, pp. 83–96, April 1956). The LOG/CFAR system has as its basis the assumption that the amplitude of a clutter signal (referred to simply as clutter hereinafter) has a probability density function which is a Rayleigh function. The system suppresses the clutter and reduces it to about the receiver noise level by sequential steps of logarithmically converting the clutter by a logarithmic converter which has a predetermined adequate characteristic constant, averaging the output of the logarithmic converter, subtracting the resulting average from a signal of interest, and subjecting the difference to an antilogarithmic conversion.

However, experiments have revealed that clutter residues still exist despite the LOG/CFAR processing. This originates from the fact that not all the clutters have probability density functions which conform to the Rayleigh function to which the LOG/CFAR technique is applicable. Rather, clutters generally have probability density functions which are expressed by the Weibull function except for limited cases. This was reported by D. C. Shleher in his paper entitled "Radar Detection in Weibull Clutter", IEEE Trans., AES-12, No. 6, pp. 736–743, 1976. Apart from the Weibull function, clutters having the Log-Normal function or Rice function cannot be coped with by the LOG/CFAR system.

For the CFAR processing of clutter having the Weibull function (referred to as Weibull clutter hereinafter), a technique using equations disclosed in U.S. Pat. No. 4,318,101 to convert the Weibull clutter into the Rayleigh clutter may be advantageously practiced since an ordinary LOG/CFAR circuit suffices for this purpose. The subject of this technique is a clutter X of the Weibull function which is expressed as $$P_W(X) = (K/\sigma)(X/\sigma)^{K-1} \cdot \exp\{-(X/\sigma)^K\} \quad (1)$$

Then, using a scale parameter $\sigma$ and a shape parameter K obtained from the clutter, a variable conversion of the clutter X is executed as $$Z = \sigma(X/\sigma)^{K/2} \quad (2)$$

The resultant signal has a probability density function which is the Rayleigh function and given by $$P_R(X) = (2X/\sigma^2) \cdot \exp\{-X^2/\sigma^2\} \quad (3)$$

(a function provided by substituting 2 for the K of equation (1)).

Such a technique is not fully acceptable because it is ineffective against clutters having other types of functions (such as a Log-Normal function and a Rice function), that is, it finds application only to Weibull clutter.

V. G. Hansen proposed a technique for suppressing clutters having any type of function (any type of probability density function) in his paper entitled "Constant False Alarm Rate Processing in Search Radars" presented in an International Conference on RADAR—PRESENT AND FUTURE held on Oct. 23-25, 1973. Whatever the cumulative distribution function $q_w(X)$ of clutter may be, the technique performs a variable transformation on the clutter as $$Z = -\log[1 - q_w(X)] \quad (4)$$

so that the probability density function of the resultant signal is transformed into an exponential function $e^{-z}$.

It is true that the Hansen's technique can convert clutter into a signal having a predetermined exponential function regardless of the type of the probability density function of the clutter. This technique still involves some problems, however. The abovementioned exponential function is a function derived from the Weibull function of equation (1) in which the K is replaced by 1 and, therefore, it is included in the Weibull function. Considering the relationship between the threshold value and the false alarm rate in CFAR processing Weibull clutter, it is known that the false alarm rate for a common threshold value decreases with the increase in the shape parameter K. It is also known that the variance Var(Z) obtainable with a LOG/CFAR circuit decreases with an increase in the shape parameter K. For details, see the paper "Suppression of Weibull-Distributed Clutters Using a Cell-Averaging LOG/CFAR Receiver" by M. Sekine et al., IEEE trans., AES-14, No. 5, pp. 823–826, September 1978, particularly FIG. 3 on p. 825, and the aforementioned paper "Radar Detection in Weibull Clutter" by D. C. Schleher, FIGS. 2-6, and a paper "Suppression of Radar Clutter" by Sekine et al., the Institute of Electronics And Communication Engineers of Japan, Trans. IECE, Vol. 62-B, No. 1, 1979, pp. 45-49, particularly FIGS. 3 and 4. Since the exponential function is the function given by substituting 1 for the shape parameter K in the Weibull function, the false alarm rate grows larger than in the case of a Rayleigh function wherein K=2. Moreover, a smaller shape parameter K needs a larger threshold value which would even cancel target signals of relatively low levels and depart from the function expected for a radar system.

As discussed above, of the prior art systems, one relying on the variable conversion of equation (2) cannot process clutters other than Weibull clutter for a constant false alarm rate. The Hansen system using the variable conversion of equation (4) can perform CFAR processing regardless of the type of the probability density function of clutter. Still, this holds true only in the theoretical aspect; in practice, due to the shape parameter which is fixed at a value of 1, not only is a small false alarm rate unavailable but a large threshold value is necessary for the CFAR processing. Such a threshold value would cancel target signals together with clutters, resulting in a poor target detectability.

SUMMARY OF THE INVENTION

An object of the present invention is to provide an adaptive CFAR processor which can realize a constant false alarm rate regardless of the type of probability density function or cumulative distribution function, as long as the function is known.

Another object of the present invention is to provide an adaptive CFAR processor which can realize a constant false alarm rate easily with an ordinary LOG/CFAR circuit regardless of the type of probability density function or cumulative distribution function, as long as the function is known.

Still another object of the present invention is to provide an adaptive CFAR processor which permits any desired threshold value to be selected for target detection in a LOG/CFAR circuit, therefore minimizing the false alarm rate and surely detecting even target signals of relatively low levels.

Yet another object of the present invention is to provide an adaptive CFAR processor of the type described having a simplified operating procedure and construction.

In accordance with the present invention, a radar signal including clutter whose amplitude X is defined by any known cumulative distribution function F(X) or probability density function f(X) is subjected to a variable conversion expressed as $$Y = \sigma[-\ln\{1-F(X)\}]^{1/K}$$

ps where $\sigma$ and K are arbitrarily determined constants. The resulting signal Y has $\sigma$ and K as its scale parameter and shape parameter, respectively. The signal is processed by an ordinary CFAR circuit (e.g. LOG/CFAR circuit). Selecting a relatively large value for the constant K, which is open to choice as well as the constant $\sigma$, not only lowers the false alarm rate to a significant degree but markedly improves the ability for detecting a target signal buried in clutters.

DETAILED DESCRIPTION OF THE INVENTION

The principle of the present invention will first be described, and then on a practical construction and arrangement which is based on said principle.

Suppose that X denotes a variable representing a clutter amplitude and that the cumulative distribution function $F_x(X)$ of the variable X is known. The present invention proposes the following equation (5) or (6) in order to convert the variable X into a new variable Y which has a probability density function $f_y(Y)$ with a shape parameter K and a scale parameter $\sigma$ which is the Weibull density function.

$$(Y/\sigma)^K = -\ln\{1-F_x(X)\} \tag{5}$$

$$Y = \sigma[-\ln\{1-F_x(X)\}]^{1/K} \tag{6}$$

That the equation (6) can convert a signal X having any type of cumulative distribution function $F_x(X)$ into an alternative variable Y whose probability density function is the Weibull function will be explained as follows.

Where the probability density function $f_x(X)$ of the variable X is known and a relation $Y=g(X)$ holds between the variables X and Y, the probability density function $f_y(Y)$ of Y is generally given by $$f_y(Y) = \frac{f_x(X)}{\left|\frac{dg(X)}{dx}\right|} \tag{7}$$

As is well known, a probability density function $f_x(X)$ and a cumulative distribution function $F_x(X)$ have an interrelation which is expressed as $$f_x(X) = \frac{dF_x(X)}{dx} \tag{8}$$

From equation (7), we obtain $$f_y(Y) = \left[\frac{f_x(X)}{\frac{dY}{dX}}\right]_{x=g^{-1}(y)} \tag{9}$$

From equation (6), we also obtain $$\frac{dY}{dX} = \frac{\sigma}{K}[-\ln\{1-F_x(X)\}]^{\frac{1}{K}-1} \cdot \frac{1}{1-F_x(X)} \cdot \frac{dF_x(X)}{dX} \tag{10}$$

Meanwhile, using equation (5), we have $$[-\ln\{1-F_x(X)\}]^{\frac{1}{k}-1} = \left(\frac{Y}{\sigma}\right)^{1-k} \tag{11}$$

$$1 - F_x(X) = \exp\left\{-\left(\frac{Y}{\sigma}\right)^K\right\} \tag{12}$$

Putting the relationships represented by equations (8), (11) and (12) into equation (10) gives $$\frac{dY}{dX} = \frac{\sigma}{K}\left(\frac{Y}{\sigma}\right)^{1-k} \cdot \exp\left\{\left(\frac{Y}{\sigma}\right)^K\right\} \cdot f_x(X) \tag{13}$$

where $\sigma>0$, $K>0$ and $Y>0$.

Based on probability density function characteristics, $f_x(X)>0$ holds. Therefore, $$\left|\frac{dY}{dX}\right| = \frac{dY}{dX} > 0 \quad (14)$$

Putting equation (13) into equation (9), we have a probability density function $f_y(Y)$ of Y expressed as $$f_y(Y) = \frac{K}{\sigma}\left(\frac{Y}{\sigma}\right)^{K-1} \cdot \exp\left\{-\left(\frac{Y}{\sigma}\right)^K\right\} \quad (15)$$

which is the Weibull density function having the shape parameter K and scale parameter $\sigma$.

What should be paid attention to in the above demonstration is the F(X) which has been treated as an entirely arbitrary function. Thus, the function F(X) may have any type of cumulative distribution characteristic. Another important feature is that the shape parameter K and scale parameter $\sigma$ can also be of any desired value. Naturally, selecting 2 for the shape parameter K and leaving the scale parameter $\sigma$ arbitrarily selectable means preparing a variable Y which has an arbitrary scale parameter $\sigma$ and obeys the Rayleigh distribution.

Previously mentioned U.S. Pat. No. 4,318,101 proposes the following equation (16) to convert, for example, a Weibull distribution signal X having a shape parameter $\eta$ and a scale parameter $\nu$ into a signal Y having the Rayleigh distribution, $$Y = \nu(X/\nu)^{\eta/2} \quad (16)$$

For n=2, the signal Y in accordance with this proposition has a probability density function $f_y(Y)$ which is given by $$f_y(Y) = \frac{2}{\nu}\left(\frac{Y}{\nu}\right) \exp\left[-\left(\frac{Y}{\nu}\right)^2\right] \quad (17)$$

and has the Rayleigh distribution.

It will now be shown that equation (16), which is the conversion equation having been proposed in U.S. Pat. No. 4,318,101, is a special case of equation (6) proposed according to the present invention. In U.S. Pat. No. 4,318,101, the incoming signal is restricted to obey a Weibull-type probability density function f(X) such as $$f(X) = \frac{\eta}{\nu}\left(\frac{X}{\nu}\right)^{\eta-1} \exp\left\{-\left(\frac{X}{\nu}\right)^\eta\right\}.$$

Therefore, using the relationship of equation (8), it is easily shown that $Fx(X) = 1 - \exp[-(X/\nu)^\eta]$, and we obtain $$1 - FX(X) = \exp[-(X/\nu)^\eta] \quad (18)$$

Accordingly, substituting equation (18) into equation (6), a converted result of the present invention is given as $$Y = \sigma\left[-\ln\left\{\exp\left(\frac{X}{\nu}\right)^\eta\right\}\right]^{\frac{1}{K}} \quad (19)$$

$$= \sigma\left(\frac{X}{\nu}\right)^{\frac{\eta}{K}}$$

It should be noted that $\nu$ and $\eta$ are the parameters of incoming signals which are treated in U.S. Pat. No. 4,318,101, while parameters $\sigma$ and K are to be selected for characterizing the converted signal.

As shown above, equation (19) converts a signal X of Weibull distribution with shape parameter $\eta$ and scale parameter $\nu$ to a signal Y of Weibull distribution with shape parameter K and scale parameter $\sigma$. It should also be noted that the values of K and $\sigma$ can be arbitrarily selected.

Comparing equation (16) with equation (19), it is now apparent that equation (16) is obtained when values of 2 and $\sigma$ are selected for K and $\sigma$, respectively. Using equation (15), and with values 2 and $\nu$ selected for K and $\sigma$, respectively, $f_y(Y)$ of Y is expressed as $$f_y(Y) = \frac{2}{\nu}\left(\frac{Y}{\nu}\right) \exp\left[-\left(\frac{Y}{\nu}\right)^2\right] \quad (20)$$

which is a Rayleigh distribution and is equal to equation (17). When values of 2 and 1 are selected for K and $\sigma$, respectively, in equation (19), the conversion relationship between X and Y becomes $$Y = (X/\nu)^{\eta/2} \quad (21)$$

Variable Y obtained by equation (21) also obeys a Weibull distribution because K is selected as the value of 2, and it is an important variable conversion equation because it decreases the number of required multiplying functions.

Figure 1:
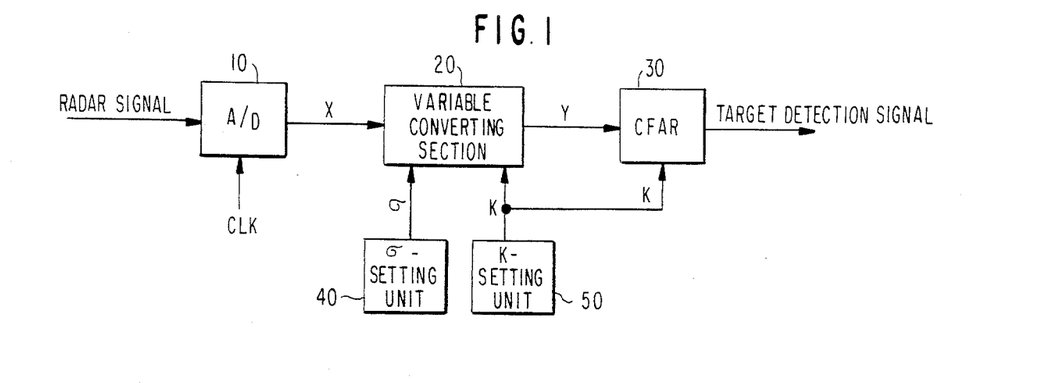
FIG. 1 is a block diagram showing a basic construction of the adaptive constant false alarm processor of the present invention.

FIG. 1 is a block diagram showing a basic construction of the adaptive CFAR processor proposed by the present invention. A return signal coming in through an antenna includes various clutters as well as a target signal as already discussed. The return signal reaching a receiver is mixed with a local oscillation signal by a mixer to be converted into an intermediate frequency (IF) signal. After amplification, the IF signal is coupled to a signal processing system such as shown in FIG. 1. To facilitate digital processing in the following stages, an analog-to-digital (A/D) converter 10 transforms the input IF signal into a digital signal having an amplitude X (referred to as a radar input signal hereinafter) in response to clock pulses CLK (not shown) of a predetermined frequency. A variable converting section 20 is supplied with a scale parameter $\sigma$ from a scale parameter $\sigma$ setting unit 40 and a shape parameter K from a shape parameter K setting unit 50. Using these parameters $\sigma$ and K and a known cumulative distribution function F(X) of the clutter contained in the radar signal, the variable converting section 20 processes the digital output of the A/D converter 10 according to $$Y = \sigma[-\ln\{1 - F(X)\}]^{1/K}$$

which has been indicated by equation (6). Then, the variable converting section 20 produces a converted signal Y. Should the cumulative distribution function F(X) be unknown and the probability density function known, equation (8) will be executed to obtain the cumulative distribution function F(X). Set and stored in the $\sigma$ setting unit 40 and K setting unit 50 are the values which were arbitrarily selected. The signal Y is the Weibull function whose probability density function has a scale parameter $\sigma$ and a shape parameter K as described, so that it is fed to a CFAR section 30 for a constant false alarm rate processing which may employ a LOG/CFAR circuit, for example. If the value of K is 2, the constant false alarm rate processing can be performed with an ordinary LOG/CFAR circuit. If the value of K is not 2, such a processing is still attainable utilizing a technique which determines a threshold value for target detection in accordance with the value of K (see U.S. Pat. No. 4,242,682 "Moving Target Indication Radar"). A probability density function of the clutter contained in the radar signal may be specified by preparing a circuitry preloaded with presumptive functions (Rayleigh, Weibull, Log-Normal, Rice) and selecting one of them which cancels the clutter more than the others. Such an implement facilitates cancellation of clutters which do not obey the Weibull distribution, as has heretofore been impossible, while remarkably reducing the danger of cancelling a target signal together with the clutters.

Figure 2:
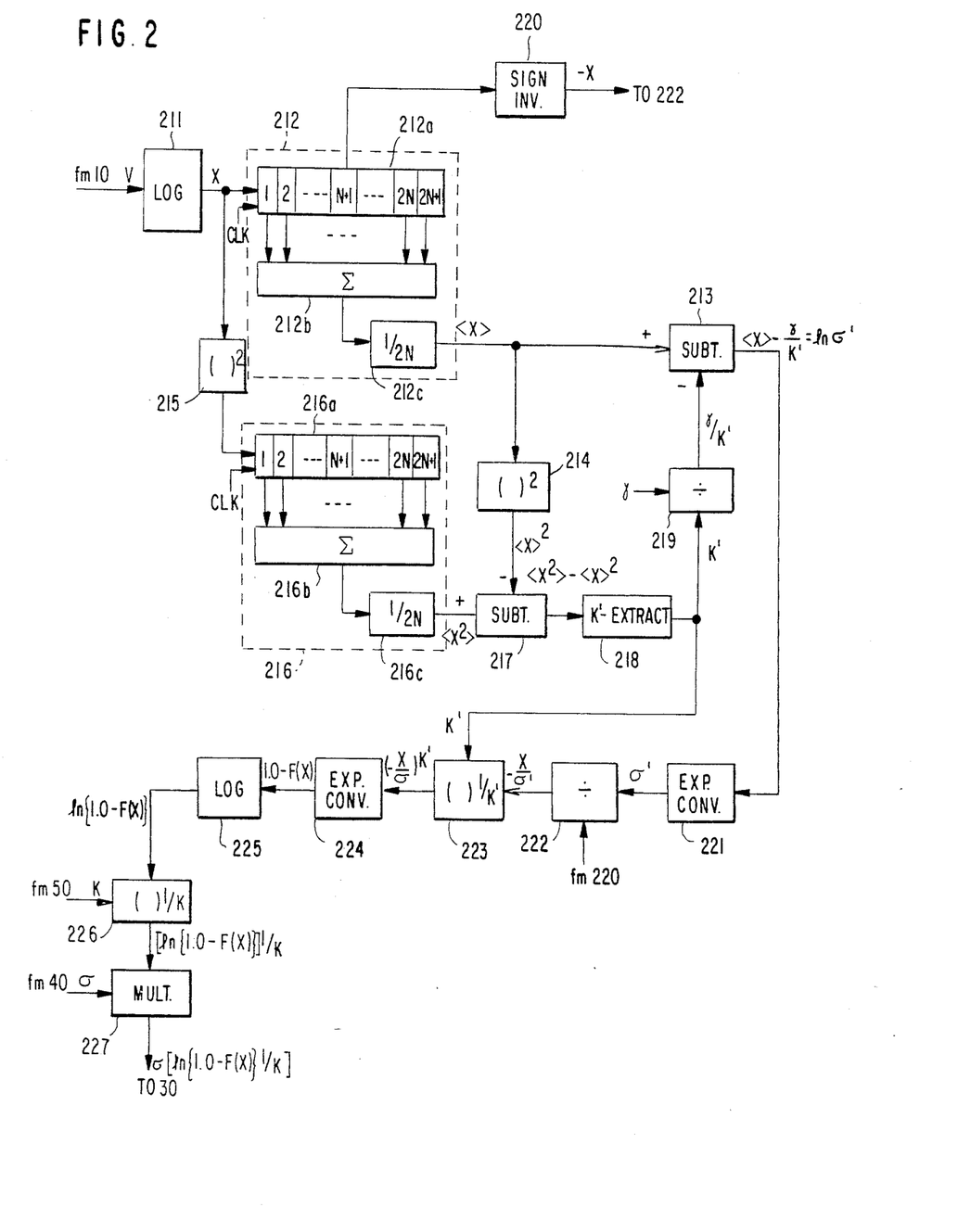
FIG. 2 is a detailed block diagram of a variable converting section 20 for Weibull clutter included in the construction of FIG. 1.

Details of the variable converting section 20 designed for Weibull clutter are illustrated in FIG. 2.

As indicated in equation (1), the signal amplitude V of Weibull clutter has a probability density function f(V) which is given by $$f(V) = \frac{K'}{\sigma'}\left(\frac{V}{\sigma'}\right)^{K'-1} \cdot \exp-\left(\frac{V}{\sigma'}\right)^{K'} \quad (22)$$

where K' and $\sigma'$ are parameters corresponding to K and $\sigma$, respectively.

The function f(V) therefore will give a cumulative distribution function F(V) when equation (8) is used. Thus, the variable conversion represented by equation (6) may be carried out using the resultant function F(V). However, to enlarge the dynamic range and permit the cumulative distribution function to be obtained more easily through a simple hardware design, the variable conversion will herein be performed using a signal X which is given by the logarithmic conversion of the signal V $$X = \ln V \quad (23)$$

It will be seen, as obvious from "Suppression of Weibull-Distributed Clutters Using a Cell-Averaging LOG/CFAR Receiver", IEEE, Vol. AES-14, that the averages $<X>$ and $<X^2>$ of X and $X^2$, respectively, are expressed as $$<X> = \ln \sigma' + \frac{\gamma}{K'} \quad (24)$$

$$<X^2> = (\ln \sigma')^2 - 2(\ln \sigma')\frac{\gamma}{K'} + \frac{1}{K'^2}\left(\frac{2}{6} + \gamma^2\right) \quad (25)$$

where $\gamma$ is the Euler's constant and approximately equals 0.5772. The logarithmic amplifier is assumed to have a characteristic parameter 1.

As follows from the above, $$<X^2> - <X>^2 = \frac{1}{K'^2} \cdot \frac{\pi^2}{6} \quad (26)$$

According, K' is given by $$K' = \frac{1}{\sqrt{<X^2> - <X>^2}} \cdot \frac{\pi}{\sqrt{6}} \quad (27)$$

From equation (24), $$\ln \sigma' = <X> - \frac{\gamma}{K'} \quad (28)$$

Then, $\sigma'$ is obtained by $$\sigma' = \exp\left(<X> - \frac{\gamma}{K'}\right) \quad (29)$$

Meanwhile, the probability density function f(X) of the signal X is given by $$f(X) = K'\left(\frac{e^x}{\sigma'}\right)^{K'} \cdot \left[e^{-\left(\frac{e^x}{\sigma'}\right)^{K'}}\right] \quad (30)$$

Therefore, the cumulative distribution function F(X) is expressed as $$F(X) = \int_{-\infty}^{X} K'\left(\frac{e^x}{\sigma'}\right)^{K'} \cdot \left[e^{-\left(\frac{e^x}{\sigma'}\right)^{K'}}\right] dX \quad (31)$$

Substituting y for $e^x$, we have $$e^x dX = dy \quad (32)$$

Accordingly, $$F(\ln y) = \int_{0}^{\ln y} \frac{K'}{\sigma'}\left(\frac{y}{\sigma'}\right)^{K'-1} \cdot \left(e^{-\left(\frac{y}{\sigma'}\right)^{K'}}\right) dy \quad (33)$$

Since equation (33) is the same as the cumulative distribution function for ln y of the Weibull probability density function, we obtain $$F(\ln y) = 1 - \exp\left(-\frac{\ln y}{\sigma'}\right)^{K'} \quad (34)$$

Re-substituting ln y by X, the cumulative distribution function F(X) of X is expressed as $$F(X) = 1 - \exp\left(-\frac{X}{\sigma'}\right)^{K'} \quad (35)$$

Thus, $$1 - F(X) = \exp\left(-\frac{X}{\sigma'}\right)^{K''} \tag{36}$$

Turning back to FIG. 2, the Weibull clutter signal V is processed by a known logarithmic converter 211 into a signal X and then coupled to an averaging circuit 212. The averaging circuit 212 comprises a known shift register 212a having a predetermined number of shift stages (in this embodiment, (2N+1) stages where N is a natural number), an adder 212b and a divider 212c. If desired, the shift register 212a may be replaced by a tapped delay line. The digital output of the A/D converter 10 shown in FIG. 1 is sequentially coupled to and shifted in the shift register 212a at the predetermined sampling intervals at the A/D converter 10. The adder 212b sums the signals stored in the respective stages of the shift register 212a except for the central (N+1)th stage. The divider 212c divides a summation output of the adder 212b by 2N to produce an average signal $<X>$. It will be understood that, if the signal in the central stage of the shift register 212a (signal of interest) were not excepted in averaging the radar signal, the signal of interest would also be suppressed in the clutter suppressive processing to degrade the S/N ratio in the case where a target signal is superposed on clutter. This is also true for the various embodiments which will follow.

The output of the logarithmic converter 211 is also fed to a square calculator 215 and thence to an averaging circuit 216. An output signal $<X^2>$ of the averaging circuit 216 indicating an average value is coupled to a subtractor 217. The averaging circuit 216, like the averaging circuit 212, comprises a shift register 216a, an adder 216b and a divider 216c. Again, the input to the adder 216b lacks the radar signal in the central stage of the shift register 216a. The subtractor 217 provides a difference between a square $<X^2>$ of an average $<X>$ prepared by a square calculator 214 and the square average $<X^2>$. The difference is supplied to a K' extractor 218. The K' extractor 218 calculates K' from the output $<X^2> - <X>^2$ of the subtractor 217 using equation (27) and produces an output indicative of the K'. A divider 219 is adapted to produce a signal indicating a ratio of Euler's constant $\gamma$ to the K' signal, $\gamma/K'$.

A subtractor 213 subtracts the $\gamma/K'$ from the average $<X>$ to produce an output $<X> - \gamma/K'$ as is shown in equation (28). This substractor output is applied to an exponential converter 221 and thereby exponentially converted into a signal which indicates the scale parameter $\sigma'$ shown in equation (29). The signal X of interest in the central stage of the shift register 212a is coupled to a sign converter 220 which inverts the input signal into a $-X$ signal. The $-X$ signal from the sign converter 220 is fed to a divider 222 which then produces a signal indicating $-X/\sigma'$. A power multiplier 223 raises the $-X/\sigma'$ signal to K'-th power which is the output of the K' extractor 218. The output $(-X/\sigma')^{K'}$ of the power multiplier 223 is supplied to an exponential converter 224 which then produces a signal indicating $\exp(-X/\sigma')^{K'}$. Since $\exp(-X/\sigma')^{K'}$ is $[1.0-F(X)]$ as will be apparent from equation (36), the $\exp(-X/\sigma')^{K'}$ signal is fed to a logarithmic amplifier 225 and thereby processed into a signal indicating in $\{1.0-F(X)\}$. The output of the logarithmic amplifier 225 is applied to a power multiplier 226 which raises the input to 1/K-th power using an output signal of a K setting unit 50 (FIG. 1) indicative of an arbitrarily selected value of K. The output of the power multiplier 226 is multiplied at a multiplier 227 by a signal output of a $\sigma$ setting unit 40 (FIG. 1) indicative of an arbitrarily selected value of $\sigma$. As a result, the multiplier 227 produces a signal which has undergone the conversion indicated by equation (6). This signal is a Weibull signal having arbitrarily selected parameters $\sigma$ and K and, thus, it is processed by the CFAR section 30 for a constant false alarm rate.

Thus, the quantity $[1.0-F(X)]$ is determined from the incoming signal based upon the parameters K' and $\sigma'$ which are characteristic of that signal, and new values K and which may be arbitrarily selected and may differ from K' and $\sigma'$ are then used at 226 and 227 to perform the conversion.

Figure 3:
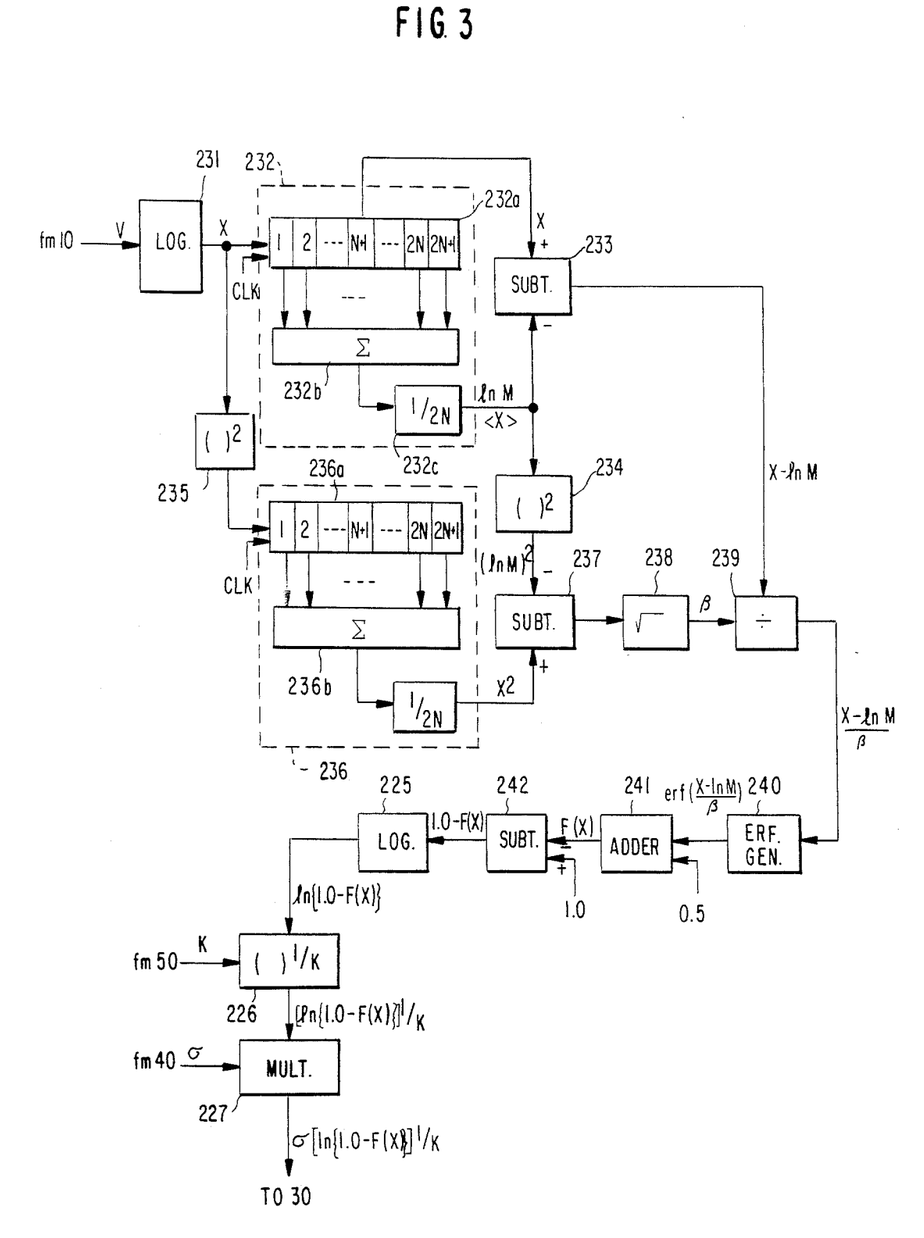
FIG. 3 is a detailed block diagram of a variable converting section 20 for Log-Normal clutter.

Referring to FIG. 3, there is shown a detailed block diagram of the variable converting section 20 for Log-Normal clutter.

As is well known in the art, the signal amplitude V of clutter is generally understood to "obey the Log-Normal distribution" when its probability density function is expressed as $$f(V) = \frac{1}{\sqrt{2\pi}\beta\, V} \exp\left[-\frac{1}{2\beta^2}\left\{\ln\left(\frac{V}{M}\right)\right\}^2\right] \tag{37}$$

where $\beta$ and M are the parameters which specify the distribution. Since in the present invention it is sufficient to obtain the cumulative distribution function F(V) from the probability density function f(V) and then perform the variable conversion of equation (6), the signal V will be logarithmically converted according to an equation $$X = \ln V \tag{38}$$

in order to enlarge the available dynamic range and simplify the construction for the variable conversion, as has been discussed in conjunction with the embodiment of FIG. 2.

Thus, the probability density function f(X) of the signal X is given by $$f(X) = \frac{1}{\sqrt{2\pi}\beta} \exp\left\{\frac{1}{2\beta^2}(X - \ln M)^2\right\} \tag{39}$$

From equation (39), we have a cumulative distribution function F(X) expressed as $$F(X) = \int_{-\infty}^{X} f(X)\, dX = \tfrac{1}{2} + erf\left(\frac{X - \ln M}{\beta}\right) \tag{40}$$

where erf is an error function, and $$erf(y) = \frac{1}{\sqrt{2\pi}} \int_0^y e^{-\frac{X^2}{2}}\, dX \tag{41}$$

As will be readily understood, equation (39) represents a normal distribution whose standard deviation is $\beta$ and expected value (average value) is ln M. Therefore, ln M and $\beta$ are given.

$$\ln M = \frac{1}{N} \sum_{i=1}^{N} X_i \qquad (42)$$

$$\beta = \sqrt{\frac{1}{N} \sum_{i=1}^{N} (X_i)^2 - (\ln M)^2} \qquad (43)$$

From equations (42) and (43), we can obtain ln M and $\beta$ and, therefore, F(X) of equation (40).

The procedure described above may be practiced in practicible with a hardware construction shown in FIG. 3. Referring to FIG. 3, the digital signal (radar signal) from the A/D converter 10 is coupled to a known logarithmic converter 231 which may be constituted by a read only memory (ROM). The resulting output X of the logarithmic converter 231 is given by equation (38). The signal X is supplied to an averaging circuit 232 in which, as in the embodiment of FIG. 2, the average (expected value ln M) $<X>$ of 2N the (2N+1) digital data excepting the central (N+1)th data is obtained. The averaging circuit 232 comprises a shift register (or a tapped delay line) 232a having (2N+1) shift stages, for example, an adder 232b for summing signals from the respective stages of the shift register 232a except the central stage, and a divider 232c for dividing an output of the adder 232b by 2N. A substractor 233 substracts the signal indicating the average ln M from the signal output X (signal data of interest) of the (N+1)th stage of the shift register 232a, thereby producing a signal (X−ln M).

Meanwhile, the output X of the logarithmic converter 231 is also fed to a square calculator 235 and thence to an averaging circuit 236. The averaging circuit 236, like the averaging circuit 232, comprises a shift register 236a, an adder 236b and a divider 236c. The averaging circuit 236 provides a square average $<X^2>$ of the data in the respective stages of the shift register 236a except the data in the (N+1)th stage. Supplied with the square average $<X^2>$, a subtractor 237 subtracts an output of a square calculator 234 from the square average $<X^2>$. The difference from the subtractor 237 is coupled to a square root calculator 238 whose output (indicating $\beta$) is in turn coupled to a divider 239. The divider 239 divides the output (X−ln M) of the subtractor 233 by the output $\beta$ of the square root calculator 238, the resulting (X−ln M)/$\beta$ being applied to an error function (erf) generator 240.

The error function generator 240 is in the form of a read only memory (ROM) which calculates in advance $$erf\left(\frac{X - \ln M}{\beta}\right) \text{ with } \frac{X - \ln M}{\beta}$$

as a variable and has these values as its addresses and stored values. Thus, the error function generator 240 will produce a signal indicating $$erf\left(\frac{X - \ln M}{\beta}\right)$$

which corresponds to an input (X−ln M/$\beta$). An adder 241 adds a signal indicating a numerical value 0.5 to an output $$erf\left(\frac{X - \ln M}{\beta}\right)$$

of the erf generator 240, thereby providing a cumulative distribution function F(X) indicated by equation (40). A subtractor 242 provides a difference between the output F(X) of the adder 241 and a signal indicative of a numerical value 1.0. The difference 1.0−F(X) is coupled from the subtractor 242 to a logarithmic converter 225 which then produces a signal indicating ln {1.0−F(X)}. A power multiplier 226 calculates [ln {1.0−F(X)}]$^{1/K}$ using the shape parameter supplied from the k setting unit 50 of FIG. 1. Finally, a multiplier 227 multiplies the output of the power multiplier 226 by the signal output of the $\sigma$ setting unit 40 which indicates the scale parameter $\sigma$. The output $\sigma$[ln {1.0−F(X)}]$^{1/K}$ of the power multiplier 226 is supplied to the CFAR section 30. As already explained, the signal inputted to the CFAR section 30 has now undergone a variable conversion according to equation (6) and, accordingly, the probability density distribution function of the converted signal is the Weibull function having a scale parameter $\sigma$ and a shape parameter K. It will be clear in FIG. 3 that the same operation proceeds even if the adder 241 is omitted and the numerical value coupled to the subtractor 242 is 0.5 instead of 1.0.

While the A/D converter 10 has been shown and described in each of the foregoing embodiments as being located just ahead of the the variable converting section 20, it will be apparent that the logarithmic converters 211, 231 in FIGS. 2 and 3 may be comprised of logarithmic amplifiers so that the A/D converter 10 just may be located after them. Further, since the value in the variable converting section 20 is also open to choice, selecting 1 for said value $\sigma$ will permit the multiplier 227 in FIG. 2 or 3 to be omitted.

Figure 4:
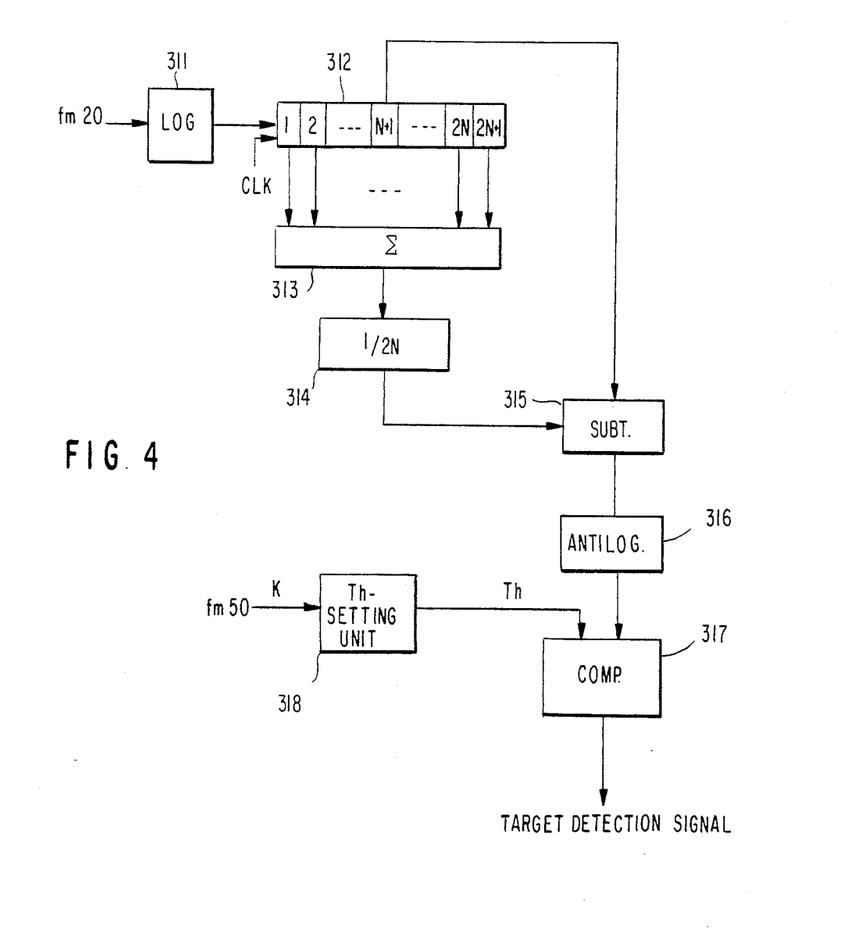
FIG. 4 is a block diagram showing an example of a CFAR section 30 of FIG. 1.

Referring to FIG. 4, a LOG/CFAR circuit which is a typical example of the CFAR section 30 is illustrated. Before proceeding with the entering details of the LOG/CFAR circuit, the principles of a LOG/CFAR processing system will be briefly described. Let Y denote a signal which has been subjected to a variable conversion to have a Weibull distribution with a specific shape parameter K and a scale parameter $\sigma$. By the IOG/CFAR processing, the signal Y is logarithmically converted according to $$Z = a \ln (bY) \qquad (44)$$

An average $<Z>$ of the Z is calculated and then a difference between Z and $<Z>$. The difference is defined as $$W = Z - <Z> \qquad (45)$$

Since W is the result of subtraction from the clutter of an average value of the clutter, it represents a fluctuation component of the clutter. Further, W is antilogarithmically converted according to $$N = c \exp (dW) \qquad (46)$$

where a, b, c and d are constants. If ad=1.0, a variance Var(N) of the N is given by $$\text{Var}(N) = c^2 e^{\frac{2}{K}\gamma} \left[ \Gamma\left(\frac{2}{K}\right) - \Gamma^2\left(\frac{1}{K}\right) + 1) \right] \quad (47)$$

where, $\Gamma$ denotes a gamma function and $\gamma = 0.5772$ (Euler's constant).

In equation (47), the variance Var(N) depends on the parameter K selected, but it will remain constant regardless of the distribution characteristics once the parameter K is determined. It follows that a constant false alarm rate is achievable if a threshold value higher than the variance Var(N) is selected.

It has been customary in LOG/CFAR processing to use the value of equation (47) which corresponds to the Rayleigh distribution where K=2. In contrast, the threshold value in accordance with the present invention is determined to be optimum in accordance with the parameter k which can have any desired value. This offers a more desirable CFAR system featuring an improved target detectability.

Turning back to FIG. 4, the Weibull clutter signal supplied from the variable converting section 20 is subjected to a logarithmic conversion by a logarithmic converter 311 the output of which is coupled to an averaging circuit. This averaging circuit is constructed in the same way as the averaging circuits shown in FIGS. 2 and 3 and has a shift register 312 furnished with (2N+1) stages, an adder 313 and a divider 314. A subtractor 315 subtracts an output of the divider 314 from the data stored in the central (N+1)th stage of the shift register 312. An antilogarithmic converter 316 antilogarithmically converts the resulting difference from the subtractor 315. The thus converted signal of the clutter has a variance of a constant value, which is dictated by the shape parameter K as previously discussed. Hence, in a threshold setting unit 318 a threshold value is determined on the basis of the shape parameter K supplied from the k setting unit 50. A comparator 317 produces a target detection signal when the output of the antilogarithmic converter 316 is larger than the threshold level, that is, when a target is present.

A characteristic feature of the present invention resides, as has been repeatedly mentioned, in the selectivity of the shape parameter k and the threshold value which is determined in accordance with the value of the shape parameter K. This not only promotes CFAR processing for clutter regardless of the type of its probability density function but, since the threshold value can be lowered to match a situation, realizes sure detection of low level target signals.

Figure 5:
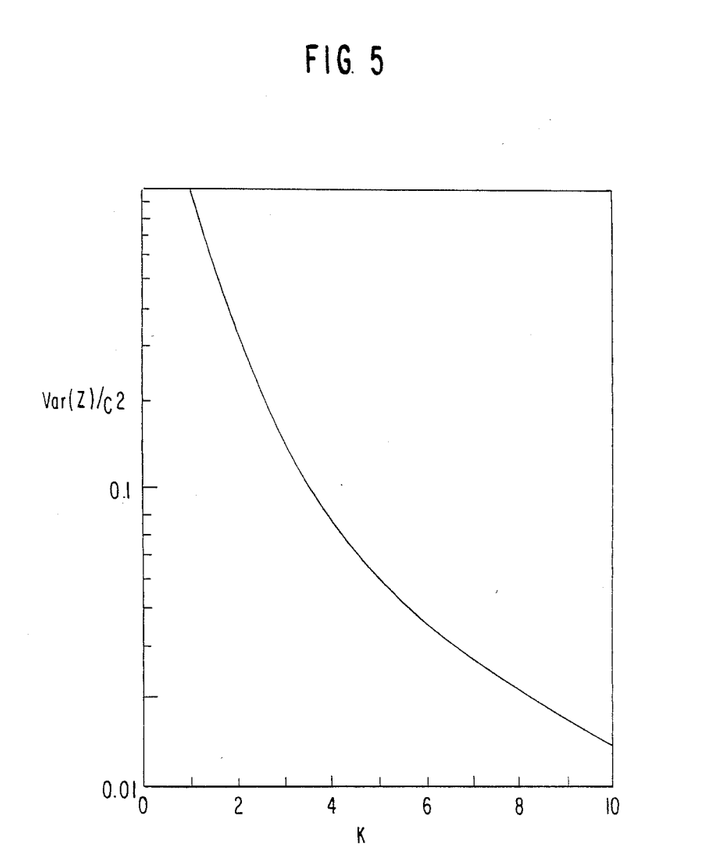
FIG. 5 is a graph representing a relationship between the shape parameter and the variance provided by the LOG/CFAR system.

As previously stated, it is known that the variance decreases with increase in the shape parameter. An example based on "Suppression of Weibull Clutters Using a Cell-Averaging LOG/CFAR Receiver" will be described with reference to FIG. 5. In FIG. 5, the abscissa indicates the shape parameter K and the ordinate the value given by dividing the variance by the square of a characteristic constant c of an antilogarithmic converter. It will be seen from the graph that the larger the shape parameter k, the smaller the value Var(Z)/c² becomes and, therefore, a smaller threshold value can be selected. Consequently, though the signal level of a true target may be relatively low, it can be safely detected if the parameter K has a relatively large value. In the graph, for instance, a function (exponential function) when K=1 in a Weibull function has Var(Z)/c² whose value is, though out of the graph and indistinct, about 10 considering the characteristic curve, and the threshold value must be set to a relatively large value which corresponds to such a high value Var(Z)/c². Then, the probability of detection of a low level target signal at the comparator 317 would be significantly lowered. Since the case concerned has the Rayleigh function K=2, the value of Var(Z)/c² is determined from the graph to be about 0.5 which is smaller by an order of magnitude than the case of K=1 and, thus, proportionally increases the target detectability. It will be clear, however, that a farther increase in the shape parameter K would set up an additional increase in the target detectability. If the shape parameter K which is open to choice in accordance with the invention is selected to be 8, the Var(Z)/c² will be about 0.02 which allows the threshold value to be far smaller compared to the case with a Rayleigh function, with a resultant remarkable increase in the target detectability.

The present invention with the freely selectable shape parameter K achieves a drastic improvement in the aspect of false alarm as well. This will be appreciated also from FIG. 6 which graphically demonstrates a relationship between the false alarm rate $P_{fa}$ obtained by the above procedure and the shape parameter K.

Figure 6:
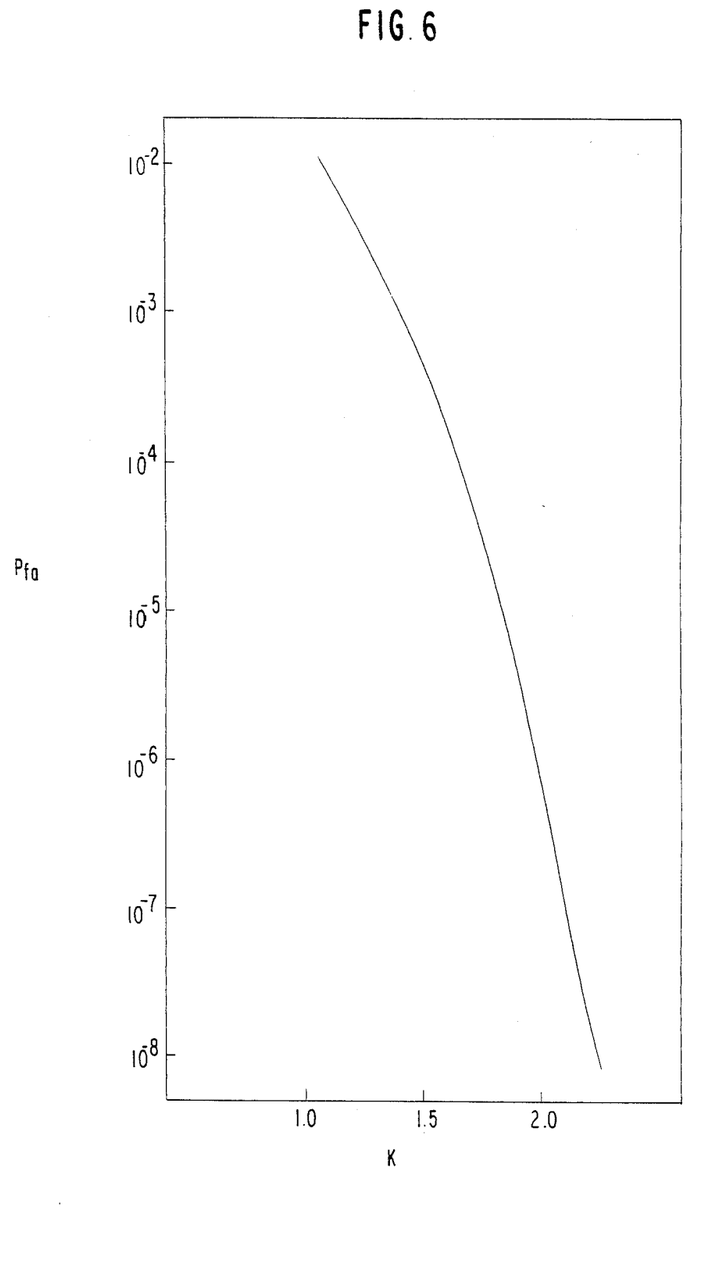
FIG. 6 is a graph demonstrating a relationship between the shape parameter and the false alarm rate.

The false alarm rate $P_{fa}$ is the probability with which clutter is erroneously determined as a target when a threshold value T is determined, and it is given by $$P_{fa} = \int_T^\infty P(Z)dZ = e^{-\left(\frac{T}{c \cdot e^{-\frac{1}{K}(-\gamma)}}\right)^K} \quad (48)$$

where Z denotes the clutter level and $\gamma$ the Euler's constant ($\gamma = 0.5772$). The value c is the characteristic constant of an antilogarithmic converter and is herein assumed to be 1 for simplicity. Then, equation (48) can be modified as $$P_{fa} = 10^{-\left(\frac{T}{2.303} e^{-\frac{0.5772}{K}}\right)^K} \quad (49)$$

Thus, a threshold value T which makes $P_{fa}$ $10^{-6}$ when K=2 is 7.527. Putting this value of T into equation (49), we obtain $$P_{fa} = 10^{-\left(3.269 \cdot e^{-\frac{0.5772}{K}}\right)^K} \quad (50)$$

When therefore a predetermined value of shape parameter K is put into equation (50), there can be set up a relationship which indicates the dependency of the false alarm rate $P_{fa}$ on the shape parameter K.

The relationship shown in FIG. 6 was determined by the above procedure. FIG. 6 shows that, as the shape parameter K increases, the false alarm rate decreases exponentially. For instance, whereas the false alarm rate $P_{fa}$ is $10^{-6}$ when k=2, it is $10^{-8}$ when k≈2.24 and this constitutes a significant improvement over the prior art LOG/CFAR in which K=2.

What is claimed is:

1. An adaptive Constant False Alarm Rate (CFAR) processor for detecting a target signal at a constant false alarm rate out of a radar input signal which includes a clutter whose amplitude X exhibits any type of known cumulative distribution function F(X) or probability density function f(X), said processor being of the type wherein said radar input signal is converted in conversion means to a signal Y and wherein said signal Y is then processed and the processed signal compared to a threshold level in CFAR processing means to obtain a target indication signal, the improvement comprising:

said conversion means including a $\sigma$ setting unit and a K-setting unit for producing signals which indicate a predetermined arbitrary scale parameter $\sigma$ and shape parameter K, respectively:

said conversion means comprising variable conversion means for converting said radar input signal into said signal Y defined by $$Y = \sigma[-ln\{1-F(X)\}]^{1/K}$$

in response to output signals of said $\sigma$ setting unit and K setting unit; and said CFAR processing means varying said threshold level in accordance with the value of said shape parameter K provided from said K setting unit.

2. An adaptive CFAR processor as claimed in claim 1, in which said $\sigma$ setting unit comprises means for producing a signal indicating a scale parameter $\sigma=1$.

3. An adaptive CFAR processor as claimed in claim 1, in which said K setting unit comprises means for producing a shape parameter K which is a real number equal to or larger than 1.

4. An adaptive CFAR processor as claimed in claim 1, further comprising A/D conversion means for receiving said radar input signals and converting them to digital form, the digital output of said A/D conversion means being coupled to said variable conversion means.

5. An adaptive CFAR processor as claimed in claim 1, in which the probability density function f(V) of the clutter amplitude V is a Weibull function having parameters $\sigma'$ and K' and given by $$f(V) = \frac{K'}{\sigma'} \cdot \left(\frac{K'}{\sigma'}\right)^{K'-1} \cdot \exp -\left(\frac{V}{\sigma'}\right)^{K'}$$

said variable conversion means comprising:

first logarithmic conversion means for performing a logarithmic conversion of said radar input signals, first averaging means for producing a signal indicative of an average value of outputs of said first logarithmic conversion means which appear within a predetermined period of time, sign inverting means for inverting the sign of a predetermined one of said outputs of said first logarithmic conversion means which appear within said predetermined period of time, first square means for squaring an output of said first averaging means, second square means for squaring an output of said first logarithmic conversion means, second averaging means for producing a signal indicative of an average value of outputs of said second square means, first subtractor means for subtracting an output of said first square means from an output of said second averaging means, shape parameter extraction means for producing a signal indicative of the value of K' by multiplying an inverse square root of an output of said first subtractor means by $\pi/\sqrt{6}$, first divider means for dividing a signal indicative of Euler's constant $\gamma$ by said K' signal in response to said K' signal, second subtractor means for subtracting an output of said first divider means from an output of said first averaging means, first exponential conversion means for determining an exponential value of an output of said second subtractor means and producing a signal indicative of a scale parameter $\sigma'$, second divider means for dividing an output of said sign inverter means by an output of said exponential conversion means, first power multiplier means for raising an output of said second divider means to K'-th power, second exponential conversion means for producing a signal which indicates the exponential value of an output of said first power multiplier means, second logarithmic conversion means for performing a logarithmic conversion of an output of said second exponential conversion means, second power multiplier means for raising an output of said second logarithmic conversion means to 1/K-th power in response to a signal output of said K setting unit which indicates said shape parameter K, and multiplier means for multiplying an output of said second power means by said $\sigma$ signal.

6. An adaptive CFAR processor as claimed in claim 1, in which the probability density function f(V) of the clutter amplitude V is a Log-Normal function having parameters $\beta$ and M and given by $$f(V) = \frac{1}{\sqrt{2\pi}\beta\, V} \exp\left[-\frac{1}{2\beta^2}\left(\ln\left(\frac{V}{M}\right)\right)^2\right]$$

the variable conversion means comprising:

first logarithmic conversion means for executing a logarithmic conversion of said radar input signals, first averaging means for producing a signal indicative of an average value of outputs of said first logarithmic conversion means which appear within a predetermined period of time, first subtractor means for subtracting a signal indicating the average value from a predetermined one of the outputs of said logarithmic conversion means which appear within said predetermined period of time, first square means for squaring an output of said first averaging means, second square means for squaring an output of said first logarithmic conversion means, second averaging means for producing a signal which indicates an average value of outputs of said second square means within a predetermined period of time, second subtractor means for subtracting an output of said first square means from an output of said second averaging means, square root means for producing a signal indicating the square root of an output of said second subtractor means, divider means for dividing an output of said first subtractor means by an output of said square root means, error function generator means for producing a signal which indicates an error function whose varaible is an output of said divider means, third subtractor means for subtracting an output of said error function generator means from a signal which indicates a numerical value 0.5, second logarithmic conversion means for performing a logarithmic conversion of an output of said third subtractor means, power means for raising an output of said second logarithmic conversion means to a 1/K-th power in response to said K signal from said K setting unit, and multiplier means for multiplying an output of said power means by said signal from said $\sigma$ setting unit.

7. An adaptive CFAR processor as claimed in claim 6, in which said third subtractor means comprises an adder for adding a numerical value of 0.5 to an output of said error function generator means, and a subtractor for subtracting an output of said adder from a signal which indicates a numerical value of 1.0.

8. An adapative CFAR processor as claimed in claim 1, in which said CFAR processing means includes:

logarithmic conversion means for executing a logarithmic conversion of an output of said variable conversion means;

averaging means for producing a signal which indicates an average value of outputs of said logarithmic conversion means which appears within a predetermined period of time;

subtractor means for subtracting an output of said averaging means from a second input comprising a predetermined one of the outputs of said logarithmic conversion means which appear within said predetermined period of time; and antilogarithmic conversion means for antilogarithmically converting an output of said subtractor means.

9. An adaptive CFAR processor as claimed in claim 8, in which said averaging means comprises a shift register which receives an output of said logarithmic conversion means and has a predetermined number (2N+1) of shift stages including a central stage, where N is a natural number, an adder for summing signals stored in a plurality of stages of said shift register other than said central stage, and a divider for dividing an output of said adder by 2N, said subtractor receiving a signal from said central stage of said shift register as said second input thereof.

* * * * *

UNITED STATES PATENT AND TRADEMARK OFFICE
CERTIFICATE OF CORRECTION

PATENT NO. : 4,513,286

DATED : April 23, 1985

INVENTOR(S) : Takeru IRABU

It is certified that error appears in the above-identified patent and that said Letters Patent is hereby corrected as shown below:

Column 2, line 30, "abovementioned" should be --above-mentioned--

Column 3, line 33, delete "ps" before "where";

Column 8, line 10, "According" should be --Accordingly--.

Column 9, line 17, "at" should be --of--;

line 50, "substractor" should be --subtractor--.

Column 10, line 68, delete the "." and insert --by--.

Column 11, lines 11 and 12, delete "in practicible";

line 21, insert --of-- before "the";

line 27, "substractor" should be --subtractor--;

line 27, "substracts" should be --subtracts--.

Signed and Sealed this

Twenty-ninth Day of October 1985

[SEAL]

Attest:

DONALD J. QUIGG

Attesting Officer

Commissioner of Patents and Trademarks—Designate